US012280001B2

(12) United States Patent
Li et al.

(10) Patent No.: US 12,280,001 B2
(45) Date of Patent: Apr. 22, 2025

(54) ELECTRIC LIFTING AND MOVING MACHINE

(71) Applicants: Shenzhen Maikangxin Medical Robot Co., Ltd., Guangdong (CN); Qian Li, Guangdong (CN); Shenzhen Chen Rui Medical Robot Co., Ltd., Shenzhen (CN); Shenzhen Maikangyi Medical Robot Co., Ltd., Shenzhen (CN)

(72) Inventors: Qian Li, Guangdong (CN); Xiaotan Guo, Guangdong (CN); Yongchao Xue, Guangdong (CN)

( * ) Notice: Subject to any disclaimer, the term of this patent is extended or adjusted under 35 U.S.C. 154(b) by 114 days.

(21) Appl. No.: 17/615,839

(22) PCT Filed: May 29, 2020

(86) PCT No.: PCT/CN2020/093470
§ 371 (c)(1),
(2) Date: Dec. 2, 2021

(87) PCT Pub. No.: WO2021/082432
PCT Pub. Date: May 6, 2021

(65) Prior Publication Data
US 2022/0323279 A1 Oct. 13, 2022

(30) Foreign Application Priority Data
Oct. 29, 2019 (CN) ......................... 201911038418.0

(51) Int. Cl.
*A61G 7/10* (2006.01)

(52) U.S. Cl.
CPC ......... *A61G 7/1013* (2013.01); *A61G 7/1059* (2013.01); *A61G 7/1073* (2013.01)

(58) Field of Classification Search
CPC ...... A61G 7/1018; A61G 7/1059; A61G 5/14; A61G 7/1013; A61G 5/124; A61G 5/1059;
(Continued)

(56) References Cited

U.S. PATENT DOCUMENTS 2,854,673 A * 10/1958 Ramsey ............... A61G 7/1046
414/665
5,405,187 A * 4/1995 Soderlund ................ A61G 5/00
297/344.21
(Continued)

FOREIGN PATENT DOCUMENTS

CN 105411781 A * 3/2016
CN 106821691 A * 6/2017
(Continued)

OTHER PUBLICATIONS

CN 105411781 English Translation (Year: 2016).*
(Continued)

*Primary Examiner* — Justin C Mikowski
*Assistant Examiner* — Amanda L Bailey

(57) ABSTRACT

An electric lifting and moving machine, including a bearing assembly consisting of a seat board to bear a user; a supporting assembly having a chassis; an electric lifting assembly having a motor driving assembly and a lifting assembly in transmission connection with each other; the lifting assembly is arranged on the chassis; at least one connection rod connected to the lifting assembly and the bearing assembly so that the lifting assembly drives the bearing the bearing assembly to move upward or downward; at least one castor on a bottom part of the chassis; and at least one foot brake assembly arranged on the chassis corresponding to the castor; in a parked state, the foot brake assembly contacts the castor to prevent it from rotating.

4 Claims, 6 Drawing Sheets

(58) Field of Classification Search
CPC .... A61G 5/104; A61G 5/1005; A61G 5/1072; A61G 7/1073; A61G 7/1046; A61G 7/1019; A61G 7/1034; A61G 7/1048; A61G 5/101; B60B 33/023; B60B 33/0078; B66F 7/14; B66F 3/08; B66F 7/12; B66F 3/10; B66F 7/10; B66F 3/18; A47C 27/081; F16H 37/124
USPC .......................................................... 297/312
See application file for complete search history.

(56) References Cited

U.S. PATENT DOCUMENTS

| | | | | | |
|---|---|---|---|---|---|
| 7,003,820 | B1 * | 2/2006 | Iura | A61G 5/128 | 5/83.1 |
| 8,156,581 | B2 * | 4/2012 | Fogleman | A61G 7/1059 | 297/312 |
| 9,579,001 | B2 * | 2/2017 | Ahmed | A61G 7/1059 | |
| 2002/0189051 | A1 * | 12/2002 | Holbrook | B60B 33/0068 | 16/18 R |
| 2007/0137535 | A1 * | 6/2007 | Jones | A47B 9/02 | 108/147 |
| 2022/0313511 | A1 * | 10/2022 | Li | F16H 37/124 | |

FOREIGN PATENT DOCUMENTS

| | | | | | |
|---|---|---|---|---|---|
| CN | 107115181 | A | * | 9/2017 | A61G 5/00 |
| CN | 107472345 | A | * | 12/2017 | |
| WO | WO-9811857 | A1 | * | 3/1998 | A61G 5/00 |
| WO | WO-2013093649 | A1 | * | 6/2013 | A61G 5/1002 |

OTHER PUBLICATIONS

CN 106821691 English Translation (Year: 2017).*
WO 9811857 English Translation (Year: 1998).*
CN 107472345 English Translation (Year: 2017).*
CN-107115181-A English Translation (Year: 2017).*
WO-2013093649-A1 (Year: 2013).*

* cited by examiner

ELECTRIC LIFTING AND MOVING MACHINE

BACKGROUND OF THE INVENTION

The present invention relates to the technical field of medical devices and more particularly an electric lifting and moving machine.

A moving machine is adopted to assist a caregiver to transfer the position a user, such as moving a patient between wheelchairs, sofas, beds, toilet pans etc.; a moving machine in the existing technology has a large size and an excessively high chassis, which can hardly access some furniture and sofas to perform moving, and is inconvenient for caregivers to carry; adopting a pin-type lifting mechanism is complicated to operate and requires users to leave the moving machine to adjust its height, which causes a low practicality and poor user experience; adopting a soft cushion to carry a user is mostly implemented in sling type and does not enable the user to sit for a long time.

In summary, the structure of an existing moving machine obviously contains inconveniences and shortcomings in actual use, and is thus necessary to be improved.

BRIEF SUMMARY OF THE INVENTION

In view of the aforementioned shortcomings, it is an object of the present invention to provide an electric lifting and moving machine which achieves automatic ascending and descending of a moving machine, with a simple structure and small volume, to improve the comfort of users.

To attain this, the present invention provides an electric lifting and moving machine, comprising:

- a bearing assembly for bearing a user, which comprises a seat board;
- a supporting assembly, which comprises a chassis;
- an electric lifting assembly, comprising a motor driving assembly and a lifting assembly; the motor driving assembly is in transmission connection with the lifting assembly; the lifting assembly is arranged on the chassis;
- at least one connecting rod, an end portion of which is connected to the lifting assembly, and another end portion is connected to the bearing assembly, so that the lifting assembly drives the bearing assembly to ascend or descend;
- at least one castor, arranged on a bottom part of the chassis;
- at least one foot brake assembly, arranged on the chassis corresponding to the castor; in a parked state of the electric lifting and moving machine, the foot brake assembly is in contact with the castor, so as to prevent the castor from rotating.

According to the electric lifting and moving machine of the present invention, the foot brake assembly comprises:

- a fixed shaft, connected to the chassis:
- a lock pedal, an end portion of which is hinged with the fixed shaft; the lock pedal rotates about the fixed shaft as an axis; another end portion of the lock pedal is a treadle; a bottom side of the treadle is provided with a buckle groove; in a parked state of the electric lifting and moving machine, the lock pedal rotates to abut against the castor;
- a buckle assembly, an end portion of which is connected to the chassis, and another end portion is a buckle matching with the buckle groove; the buckle is in interference fit with the buckle groove; when in the parked state of the electric lifting and moving machine, a position of the buckle is a arranged such that the buckle is locked with the buckle groove.

According to the electric lifting and moving machine of the present invention, the lifting assembly comprises a movable portion and a fixed portion; the movable portion ascends or descends with respect to the fixed portion; the end portion of the connecting rod 30 is connected to the movable portion;

- the movable portion comprises:
- a worm, the worn is in transmission connection with the motor driving assembly;
- a worm wheel, the worm wheel is in transmission connection with the worm;
- a rotating shaft, which penetrates a center part of the worm wheel and is fixedly connected to the worm wheel;
- at least one gear; the rotating shaft penetrates a center part of the gear, and is fixedly connected to the gear;
- the fixed portion comprises:
- at least one gear rack, which is vertically arranged and meshes with the at least one gear; a bottom part of the gear rack is connected to the chassis.

According to the electric lifting and moving machine of the present invention, said at least one connecting rod comprises two connecting rods;

- said at least one gear rack is arranged on at least one gear rack column; said at least one gear tack column comprises two gear rack columns; the two gear rack columns are positioned corresponding to the two connecting rods; a bottom part of each of the two connecting rods is hollow to fit with the corresponding gear rack column;
- said at least one gear comprises two gears, and arranged respectively on a left end portion and a right end portion of the rotating shaft.

According to the electric lifting and moving machine of the present invention, an outer part of the movable portion is provided with a sleeve, openings are provided on the sleeve corresponding to positions where the gears are connected to the gear racks;

the two connecting rods are connected to the sleeve.

According to the electric lifting and moving machine of the present invention, the bearing assembly comprises:

- two supporting rods arranged vertically, and connected respectively to a left side and a right side of a front part of the seat board: the two supporting rods are connected respectively to the two connecting rods;
- a seat hack; an end portion of which connected to a rear part of the seat board.

According to the electric lifting and moving machine of the present invention, the seat board comprises a left seat board and a right seat board; the left seat board and the right seat board are connected through a first detachable connecting member;

- the seat back comprises a left seat back and a right seat back; the left seat back and the right back are connected through a second detachable connecting member; an end portion of the left seat back is connected to a rear part of the left seat board; an end portion of the right seat board is connected to a rear part of the right seat board;
- the two supporting rods are respectively hinged with the two connecting rods; the supporting rods are rotatable about the connecting rods respectively where the connecting rods are used as rotational axes of the supporting rods;

alternatively, the left seat board and the right seat board are respectively hinged with the two supporting rods through hinging members; the left seat board and the right seat board are rotatable respectively about the two supporting rods where the two supporting rods are used as rotational axes of the left seat board and the right seat board.

According to the electric lifting and moving machine of the present invention, a ring of steel balls is provided around each gear rack column at a position which does not coincide with the gear rack; a roller provided at an inner part of each of the two connecting rods.

According to the electric lifting and moving machine of the present invention, the electric lifting and moving machine further comprises gas springs; an end portion of each gas spring is connected to the chassis, and another end portion is connected to a corresponding connecting rod.

According to the electric lifting and moving machine of the present invention, the motor driving assembly and the lifting assembly are detachably connected; the motor driving assembly comprises:

- a carrier board, arranged vertically along a longitudinal direction;
- a motor, connected to a right side of the carrier board;
- a first baffle, arranged vertically along a horizontal direction, a right end of which is connected to a left side of the carrier board;
- a second baffle, arranged symmetrically to the first baffle, right end of which is connected to a left side of the carrier board;
- a first clamping portion, which is rotatably connected to the first baffle;
- a second clamping portion, arranged symmetrically to the first clamping portion, and rotatably connected to the second baffle;
- a grip, arranged horizontally along a longitudinal direction; the grip is arranged above the first baffle and the second baffle; a front end portion of which is connected to the first clamping portion, a rear end portion of which is connected to a second clamping portion;

the first clamping portion comprises:

- a first hook, a lower part of the first hook is in a hook shape bending to a right side; a middle part of the first hook is connected to the first baffle through a first rotating axis; the first hook is rotatable about the first rotating axis;
- a first connecting rod, a left end portion of which is rotatably connected to an upper portion of the first hook, and a right end portion of which is rotatably connected to one end of a second connecting rod;

another end of the second connecting rod is connected to a front end portion of the grip;

the second clamping portion comprises:

- a second hook, a lower part of the second hook is in a hook shape bending to a right side; a middle part of the second hook is connected to the second baffle through a second rotating axis; the second hook is rotatable about second rotating axis;
- a third connecting rod, a left end portion of which is rotatably connected to an upper portion of the second hook, and a right end portion of which is rotatably connected to one end of a fourth connecting rod;

another end of the fourth connecting rod is connected to the rear end portion of the grip.

The present invention provides an electric lifting and moving machine, comprising: a bearing assembly which comprises a chassis, and the chassis is adopted to stabilize a bearing assembly and an electric lifting assembly; the bearing assembly comprises a seat board; when using the electric lifting and moving machine, a user sits on the seat board and the motor driving assembly of the electric lifting assembly drives the lifting assembly; the lifting assembly ascends or descends and thus drives the bearing assembly to ascend or descend through the connecting rods. Therefore, the electric lifting and moving machine of the present invention achieves automatic ascending and descending with a simple structure and small volume, and improves the comfort of users.

DETAILED DESCRIPTION OF THE INVENTION

Figure 1:
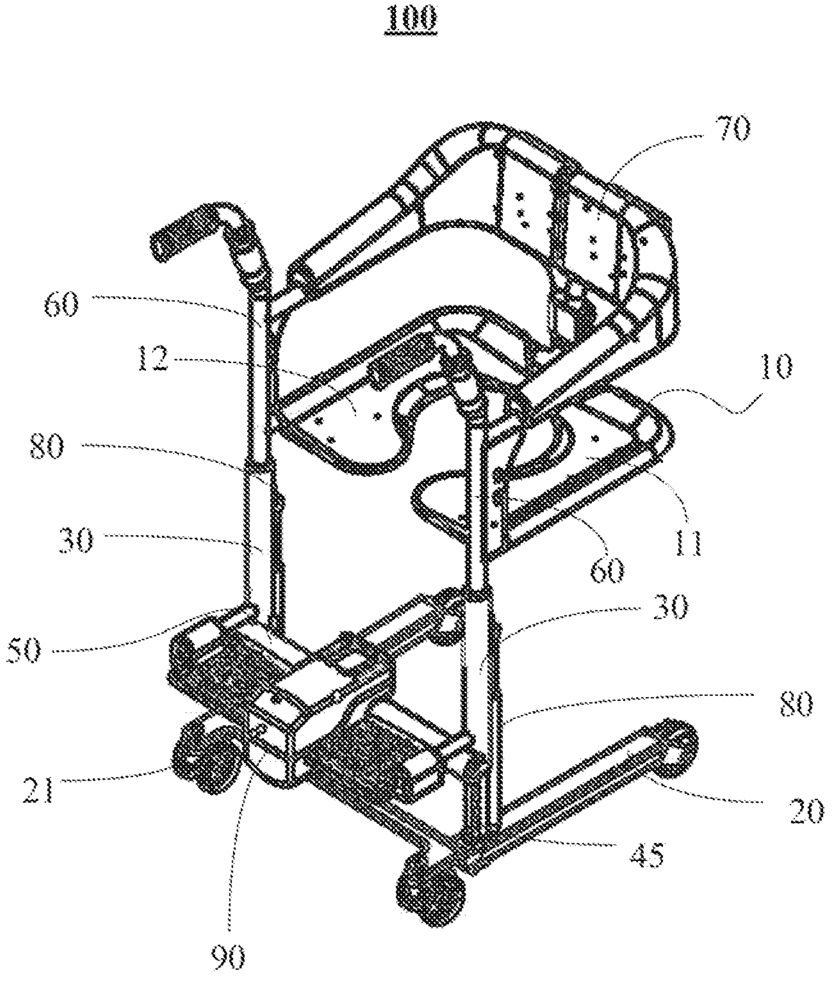
FIG. 1 shows a schematic diagram of the electric lifting and moving machine provided by an embodiment of the present invention.

To better clarify the purposes, technical solutions and advantages of the present invention, the following will further describe in detail the present invention with reference to the accompanying drawings and embodiments. It should be understood that the specific embodiments described here are only intended to explain the present invention, but not to limit the present invention.

To better clarify the purposes, technical solutions and advantages of the present invention, the following will further describe in detail the present invention with reference to the accompanying drawings and embodiments. It should be understood that the specific embodiments described here are only intended to explain the present invention, but not to limit the present invention.

As illustrated in FIGS. 1-5, a first embodiment of the present invention provides an electric lifting and moving machine 100, comprising:

- a bearing assembly for bearing a user, which comprises a seat board 10;
- a supporting assembly, which comprises a chassis 20;
- an electric lifting assembly, comprising a motor driving assembly 90 and a lifting assembly; the motor driving assembly 90 is in transmission connection with the lifting assembly; the lifting assembly is arranged on the chassis 20;
- at least one connecting rod 30, an end portion of which is connected to the lifting assembly, and another end portion is connected to the bearing assembly, so that the lifting assembly drives the bearing assembly to ascend or descend;

at least one castor 21, arranged on a bottom part of the chassis 20;

at least one foot brake assembly, arranged on the chassis 20 corresponding to the castor 21; in a parked state, the foot brake assembly is in contact with the castor 21, so as to prevent the castor 21 from rotating.

In this embodiment, the electric lifting and moving machine 100 bears a user whose position needed to be transferred through a bearing assembly; the bearing assembly is provided with the seat board 10 for the user to sit; the supporting assembly, which comprises the chassis 20, stabilizes the bearing assembly and the electric lifting assembly; preferably, the bearing assembly further comprises said at least one castor 21; the castor 21 is arranged on the bottom part of the chassis 20; through arranging the castor 21 the movement of the electric lifting and moving machine 100 becomes more convenient; by arranging the lifting assembly on the chassis 20, the motor driving assembly 90 and the lifting assembly are in transmission connection, the motor driving assembly 90 transforms electrical power to mechanical movement so that the lifting assembly performs ascending or descending movements automatically, and thus drives the bearing assembly to ascend or descend through the connecting rod 30, thereby saving manpower and improving user experience. Preferably, the supporting assembly, the bearing assembly and the at least one connecting rod 30 are hollow and made of metals to reduce the weight and enhance the mechanical strength of the electric lifting and moving machine. The seat board 10 has an ergonomic design to increase the comfort of the user. Preferably, a height of the chassis 20 can be lowered to fit most furniture, and thus become more convenient to push the chassis 20 of the electric lifting and moving machine 100 into a gap under the furniture to realize moving of the user.

Figure 6:
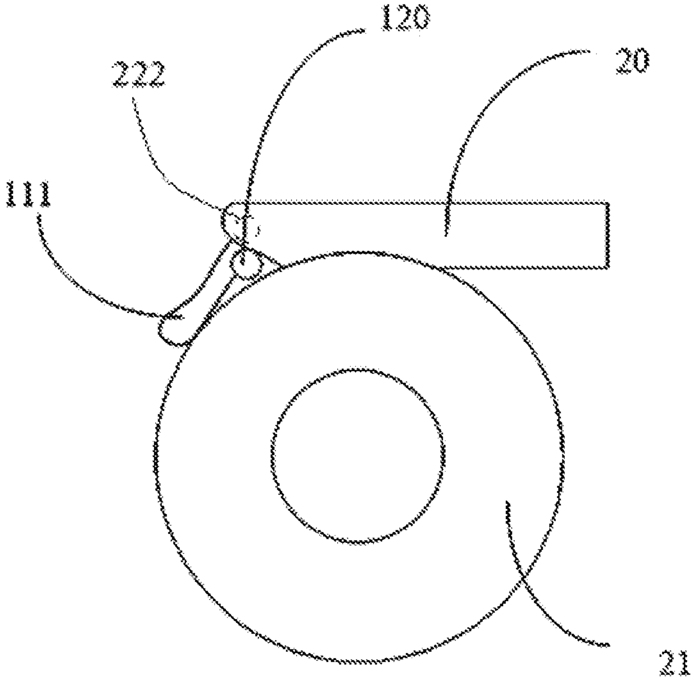
FIG. 6 shows a schematic diagram of a foot brake assembly and a castor in a parked state provided by an embodiment of the present invention.
Figure 7:
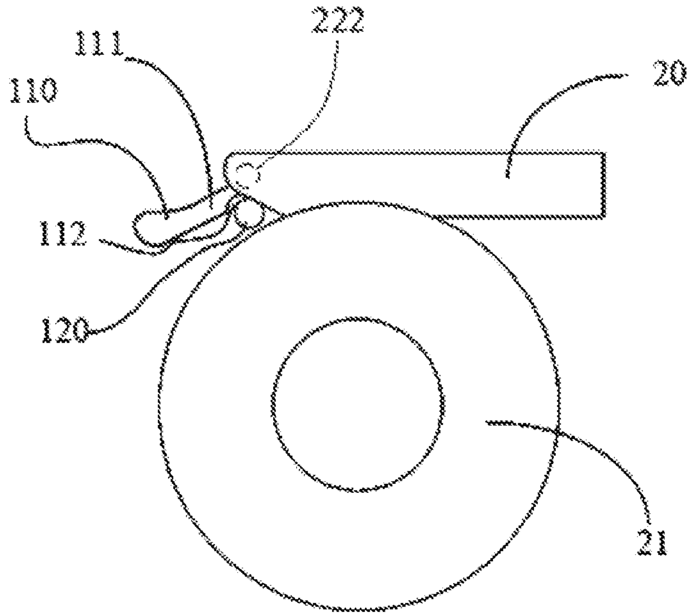
FIG. 7 shows schematic diagram of a foot brake assembly detached from a castor, and a buckle, provided by an embodiment of the resent invention.

As illustrated in FIGS. 6-7, specifically the foot brake assembly comprises:

a fixed shaft 222, connected to the chassis 20;

a lock pedal 110, an end portion of which is hinged with the fixed shaft 222; the lock pedal 110 rotates about the fixed shaft 222 as an axis; another end portion of the lock pedal 110 is a treadle 111: a bottom side of the treadle 11 is provided with a buckle groove 112; in a parked state, the lock pedal 110 rotates to abut against the castor 21;

a buckle assembly, an end portion of which is connected to the chassis 20, and another end portion is a buckle 120 matching with the buckle groove 112; the buckle 120 is in interference fit with the buckle groove 112; when in the parked state, a position of the buckle 120 is arranged such that the buckle 120 is locked with the buckle groove 112.

In this embodiment, the foot brake assembly abuts against the castor 21 through the lock pedal 110, thereby fixing the castor 21 and preventing the castor 21 to rotate; the buckle 120 is adopted in the parked state to fix the lock pedal 110, so that the lock pedal 110 maintains abutting against the castor 21. As illustrated in FIG. 6, when parking with the foot brake assembly, a user can step down on the treadle 111 until it abuts against the castor 21; at this time, the buckle 120 is also snapped into the buckle groove 112 to be fixed. As illustrated in FIG. 7, when the electric lifting and moving machine 100 is required to be moved, push the treadle 111 upward to detach the castor and the buckle 120.

Figure 2:
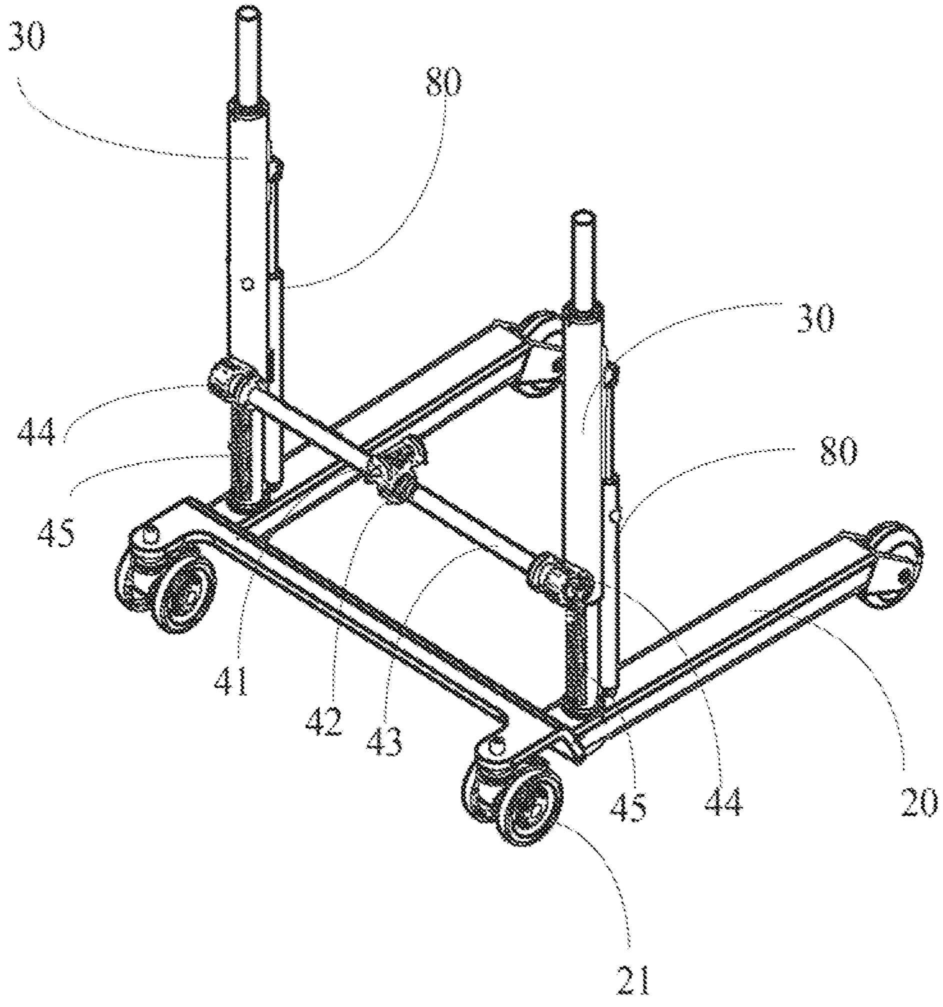
FIG. 2 shows a partially enlarged view of the lifting assembly provided by an embodiment of the present invention.

As illustrated in FIG. 2, in a second embodiment of the present invention, the lifting assembly comprises a movable portion and a fixed portion; the movable portion ascends or descends with respect to the fixed portion; the end portion of the connecting rod 30 is connected to the movable portion;

the movable portion comprises:

a worm 41, the worm 41 is in transmission connection with the motor driving assembly 90;

a worm wheel 42, the worm wheel 42 is in transmission connection with the worm 41;

a rotating shaft 43, which penetrates a center part of the worm wheel 42 and is fixedly connected to the worm wheel 42;

at least one gear 44; the rotating shaft 43 penetrates a center part of the gear 44, and is fixedly connected to the gear 44;

the fixed portion comprises:

at least one gear rack 45, which is vertically arranged and meshes with the gear 44; a bottom part of the gear rack 45 is connected to the chassis 20.

In this embodiment, utilizing the self-locking characteristics of the worm 41 and the worm wheel 42 enables the lifting assemble to stop ascending or descending at any height, thereby controlling the bearing assembly at any height according to users' needs. The motor driving assembly 90 outputs force to the worm 41, and the worm 41 synchronously drives the worm wheel 42 to rotate; as the worm wheel 42 and the gear 44 are both fixedly connected to the rotating shaft 43, rotation of the worm wheel 42 drives the gear 44 to rotate, and the rotating gear 44 ascend or descend along the vertically arranged gear rack 45; simultaneously, the ascending or descending of the gear 44 enables the movable portion whose members are interconnected to ascend or descend as well; said another end portion of the connecting rod 30 is connected to the bearing assembly, and said end portion is connected to the movable portion, thereby enabling the bearing assembly to ascend or descend along with the movable portion As illustrated in FIG. 1, in a third embodiment of the present invention, two connecting rods 30 are provided;

said at least one gear rack 45 is arranged on at least one gear rack column; specifically, two gear rack columns are provided; the two gear rack columns are positioned corresponding to the two connecting rods 30; a bottom part of each of the two connecting rods is hollow to fit with the corresponding gear rack column:

two gears 44 are provided, and arranged respectively on a left end portion and a right end portion of the rotating, shaft 43.

In this embodiment, the gear rack columns are used for stabilizing the gear racks 45; the gear rack columns are positioned corresponding to the connecting rods 30, and the bottom part of each of the connecting rods 30 is hollow; therefore, when the connecting rods 30 ascend or descend along with the movable portion, the gear rack columns gradually insert into the connecting rods 30 or gradually withdraw from the connecting rod 30. The motion transmission of the worm 41 and the worm wheel 42 cooperating with each other drives the two gears 44 respectively arranged at the left end portion and the right end portion of the rotating shaft 43; the two gears 44 synchronously perform ascending or descending movement on the two gear racks 45 respectively, so as to drive the bearing assembly to ascend or descend. The worm 41 and the worm wheel 42 cooperate to achieve motion transmission self-locking, which enables the lifting assembly to stop ascending or descending at any height, thereby controlling the tearing assembly at any height according to users' needs.

As illustrated in FIG. 1 specifically, an outer part of the movable portion is provided with a sleeve 50, so as to package tree members of the movable portion into an integral component, and the sleeve 50 is connected with each component through a circlip; openings are provided on the sleeve 50 corresponding to positions where the gears 44 are connected to the gear racks 45; the sleeve 50 sleeves the movable portion which contains the worm 41, the worm wheel 42 and gears 44, and is provided with the openings for the gears 44 to mesh with the corresponding gear racks 45; the two connecting rods 30 are connected to the sleeve 50. Preferably, the connecting rods 30 are welded on the sleeve 50.

Figure 5:
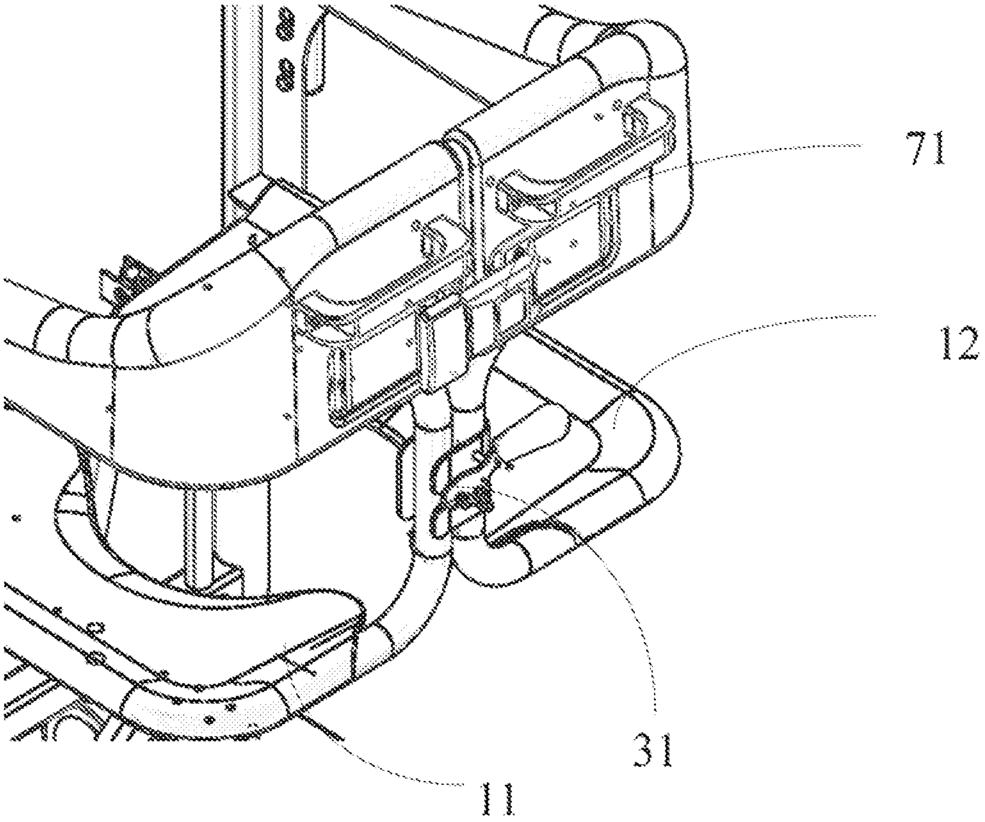
FIG. 5 shows a partially enlarged view of a bearing assembly provided an embodiment of the present invention.

As illustrated in FIG. 1 and FIG. 5, in a fourth embodiment of the present invention, the bearing assembly comprises:

two supporting rods 60 arranged vertically, and connected respectively to a left side and a right side of a front part of a seat board 10; the two supporting rods 60 are connected respectively to the two connecting rods 30; when a caregiver pushes the electric lifting and moving machine 100, both hands can held on the supporting rods 60 to apply a push force. Preferably, an upper part of each of the supporting rods 60 is an armrest curving forward, which is convenient for the caregiver to hold.

A seat back 70, an end portion of which is connected to a rear part of a seat board 10. The seat back 70 is adopted to support the back of the user.

Preferably, the seat board 10 comprises a left seat board 11 and a right seat board 12 respectively arranged on a left part and a right part; the left seat board 11 and the right seat board 12 are connected through a first detachable connecting member 31;

the seat back 70 comprises a left seat back and a right seat back; the left seat back and the right back are connected through a second detachable connecting member 71; an end portion of the left seat back is connected to a rear part of the left seat board; an end portion of the right seat board is connected to a rear part of the right seat board 12;

the two supporting rods 60 are respectively with the two connecting rods 30; the supporting rods 60 are rotatable about the connecting rods 30 respectively where the connecting rods 30 are used as rotational axes of the supporting rods 60.

Alternatively, the left seat board 11 and the right seat board 12 are respectively hinged with the two supporting rods through hinging members; the left seat board 11 and the right seat board 12 rotate respectively about the two supporting rods where the two supporting rods are used as rotational axes.

In this embodiment, each of the first detachable connecting member 31 and the second detachable connecting member 71 is preferably configured as cooperating structure comprising a pin and a lock; when the left seat board 11 and the right seat board 12 are needed to be separated and spread towards two sides away from each other, manually unfasten the lock arranged on the left seat board 11, so that the lock disengages from the pin arranged on the right seat board 12; and now the left seat board 11 and the right seat board 12 are in an opened state. To bring the left seat board 11 and the right seat board 12 together towards each other, the caregiver can rotate the left seat board 11 and the right seat board 12 towards each other by rotating the armrests till a maximum extent, so that the lock on the left seat board 11 is automatically buckled to the pin of the right seat board 12, and the seat board 10 is now in a closed state. When the user needs to move his or her body from one position to a predetermined position, the caregiver rotates the left seat board 11 and the right seat board 12 to the opened state, moves the electric lifting and moving machine 100 towards the user until the left seat board 11 and the right seat board 12 are located approximately on both sides of the user's buttocks, and then rotate the armrests to drive the left seat board 11 and the right seat board 12 to close, so that the user sits on the seat board 10, and then, the caregiver moves the electric lifting and moving machine 100 to the predetermined position; by ascending and descending adjustments, the seat board 10 is adjusted to align as much as possible to the predetermined position, such as a sofa; in this case, adjust the seat board 10 to align with a seat of the sofa as much as possible, and then rotate the left seat board 11 and the right seat board 12 again to the opened state, so that the user leaves the seat board 10; thus, the transfer of a user's position is achieved without requiring caregivers to shift, lift, or embrace the user's body. Preferably, a stop pin is arranged on the seat board 10, so that the rotating angles of the left seat board 11 and the right seat board 12 are both ninety degrees.

In a fifth embodiment of the present invention, a ring of steel balls is provided around each gear rack column at a position which does not coincide with the gear rack 45; a roller is provided at an inner part of each of the two connecting rod 30.

In this embodiment, the ascending and descending of the electric lifting and moving machine 100 are achieved through the relative motion between the gears 44 and the gear racks 45; in view of a problem of center of gravity of the electric lifting and moving machine 100, which causes problems including incomplete meshing between the gears 44 and the gear racks 45, the verticality when ascending or descending, and the friction between inner walls of the connecting rods 30 and the gear rack columns/hen ascending or descending, said ring of steel balls is therefore fixedly provided around each gear rack column at the position which does not coincide with the gear rack 45, and a roller is fixedly provided at the inner part of each connecting rod 30 to create frictional contact with the corresponding gear rack column. These two configurations when used together provides rolling frictional contact and point-to-point frictional contact respectively with a view to solving the aforementioned problems.

As illustrated in FIGS. 1-2, in a sixth embodiment of the present invention, the electric lifting and moving machine 100 further comprises gas springs 80; an end portion of each gas spring 80 is connected to the chassis 20, and another end portion is connected to a corresponding connecting rod 30.

In this embodiment, the gas springs 80 are adopted to relieve pressure, an end connector of each gas spring 80 is welded on the corresponding connecting rod 30, and another end connector of each gas spring 80 is welded on the supporting assembly, so as to solve the problem of incomplete meshing between the gears 44 and the gear racks 45 caused by the problem of center of gravity of the electric lifting and moving machine 100, as well as to relieve gravity.

Figure 3:
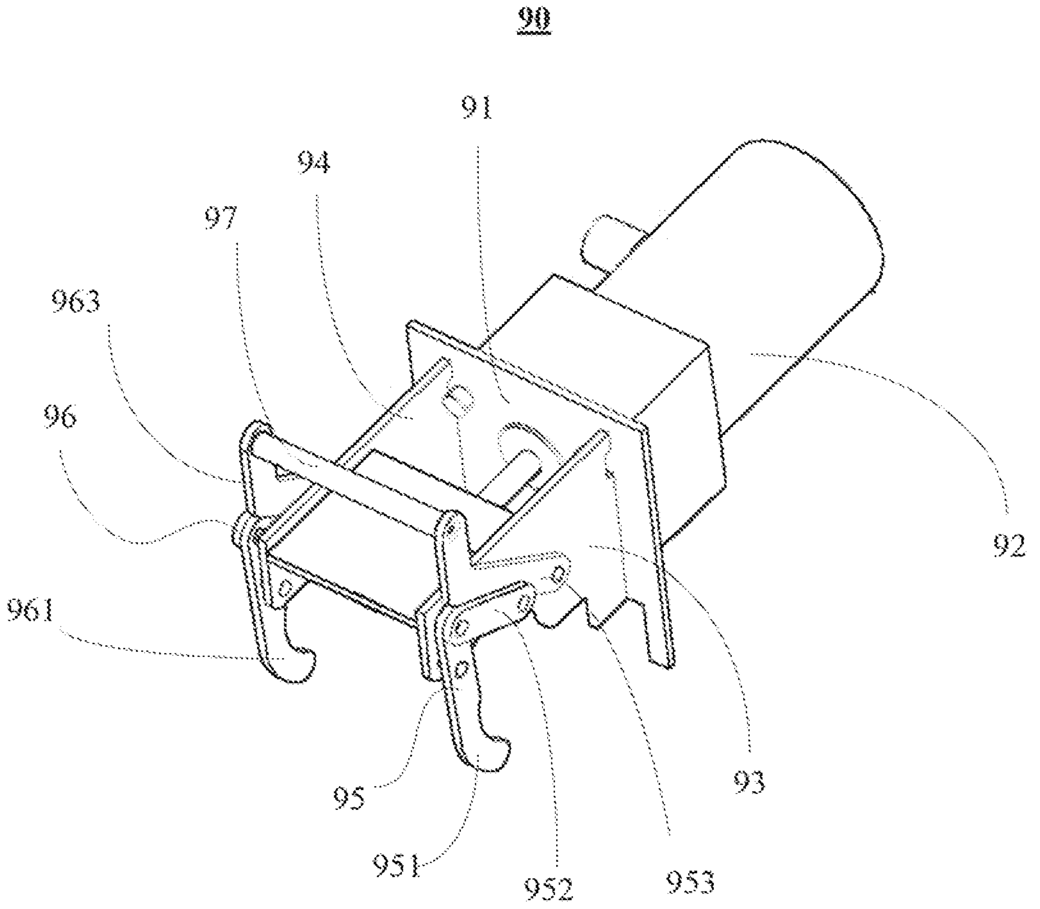
FIG. 3 shows a structural diagram of a motor driving assembly provided by an embodiment of the present invention in a first working state.
Figure 4:
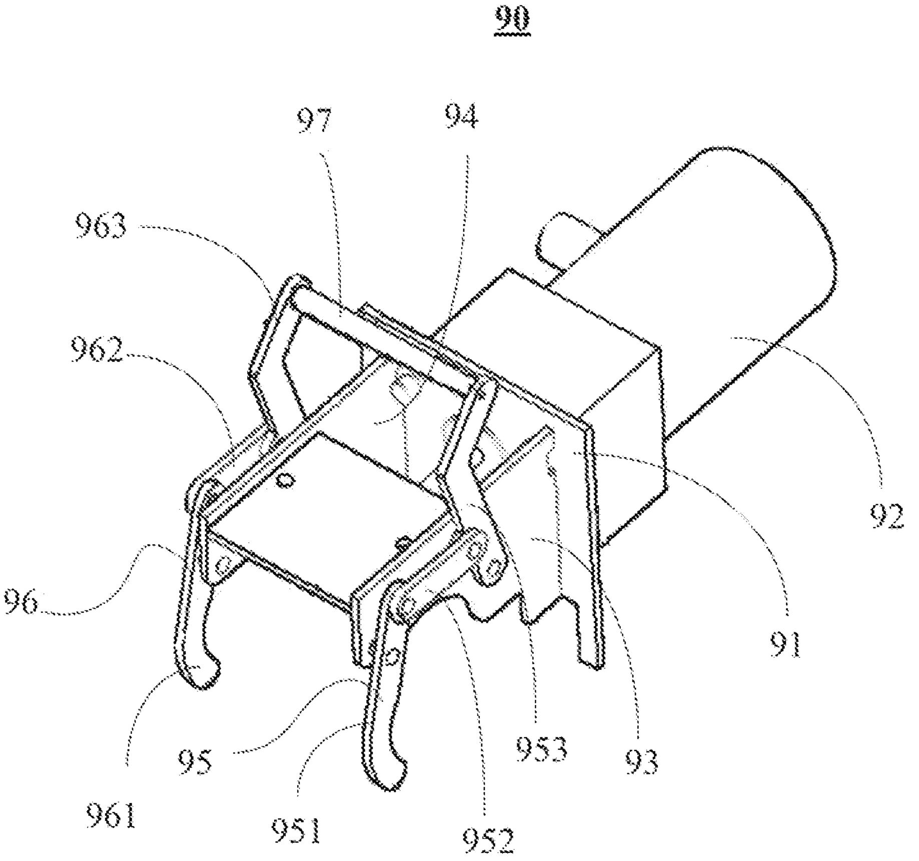
FIG. 4 shows a structural diagram of a motor driving assembly provided by an embodiment of the present invention in a second working state.

As illustrated in FIGS. 3-4, in a seventh embodiment of the present invention, the motor driving assembly 90 and the lifting assembly are detachably connected: the motor driving assembly 90 comprises:

a carrier board 91, arranged vertically along a longitudinal direction;

- a motor 92, connected to a right side of the carrier board 91;
- a first baffle 93, arranged vertically along a horizontal direction, a right end of which is connected to a left side of the carrier board 91;
- a second baffle 94, arranged symmetrically to the first baffle 93, right end of which is connected to a left side of the carrier board 91;
- a first clamping portion 95, which is rotatably connected to the first baffle 93;
- a second clamping portion 96, arranged symmetrically to the first clamping portion 95, and rotatably connected to the second baffle 96;
- a grip 97, arranged horizontally along longitudinal direction; the grip 97 is arranged above the first baffle 93 and the second baffle 94; a front end portion of which is connected to the first clamping portion 95, a rear end portion of which is connected to a second clamping portion 96;

the first clamping portion 95 comprises:

- a first hook 951, a lower part of the first hook 951 is in a hook shape bending to a right side; a middle part of the first hook 951 is connected to the first baffle 93 through a first rotating axis; the first hook 951 is rotatable about the first rotating axis;
- a first connecting rod 952, a left end portion of which is rotatably connected to an upper portion of the first hook 951, and a right end portion of which is rotatably connected to one end of a second connecting rod 953;

another end of the second connecting rod 953 is connected to the front end portion of the grip 97;

the second clamping portion 96 comprises:

- a second hook 961, a lower part of the second hook 961 is in a hook shape bending to a right side; a middle part of the second hook 961 is connected to the second baffle 94 through a second rotating axis; the second hook 961 rotates about the second rotating axis;
- a third connecting rod 962, a left end portion of which is rotatably connected to an upper portion of the second hook 961, and a right end portion of which is rotatably connected to one end of a fourth connecting rod 963;

another end of the fourth connecting rod 963 is connected to the rear end portion of the grip 97.

In this embodiment, arranging the motor driving assembly 90 to be detachably connected to the lifting assembly solves problems caused by the fixed connection between the motor driving assembly 90 and the electric lifting and moving machine 100, such as difficulty of repair, large size, inconvenience to transport, and damages attributable to non-waterproofness. The motor driving assembly 90 configures the motor 92 to be assembled integrally with a quick disassembly clamping structure; specifically, the motor 92 and the quick disassembly clamping structure are fixed onto the carrier board 91; when the motor driving assembly 90 is needed to perform driving, a user connects the motor 92 to the lifting assembly, and fixes the lifting assembly through the quick disassembly clamping structure; after usage, the user can detach the motor driving assembly 90 for convenient maintenance and preventing damages caused by water ingress into the motor driving assembly 90 when the user is bathing. Through pushing the grip 97, the second connecting rod 953 and the fourth connecting rod 963 are simultaneously driven, the linkage between the second connecting rod 953 and the first connecting rod 952 drives the first hook 951 to rotate; analogously, the second hook 961 rotates; when the first hook 951 and the second hook 961 rotate until an included angle between the the first hook 951 and the first baffle 93 and an included angle between the second hook 961 and the second baffle 94 become smaller, the lifting assembly is locked between the two hooks and the two baffles, so that the motor driving assembly 90 and the lifting assembly are fixed; when the first hook 951 and the second hook 961 rotate until the included angle between the first hook 951 and the first baffle 93 and the included angle between the second hook 961 and the second baffle 94 become larger, the motor driving assembly 90 can be detached from the lifting assembly. Specifically, when a user pushes the grip 97 to a left side, the grip 97 drives the second connecting rod 953, and the second connecting rod 593 drives the first connecting rod 952 to drive the first hook 951 to rotate, so that the first hook rotates in a counterclockwise direction to gradually reduce the included angle between the first hook and the first baffle until the first hook 951 is in a locked state (as illustrated in FIG. 3), the lifting assembly will thus be fixed between the first hook 951 and the first baffle 93; since the force borne by the first hook 951 and the first connecting, rod 952 and the farce borne by the first connecting rod 952 and the second connecting rod 953 react mutally against each other, the first hook 951 therefore performs self-locking; the grip 97 is fixed with the second connecting rod 953 with a screw; the second connecting rod 952 and the first baffle 93 are connected with a rivet; the first connecting rod 952 and the second connecting rod 933 are connected with a rivet; the first connecting rod 952 and the first hook 951 are connected with a rivet; the motor 92 and the carrier board 91 are fixed by screws and gaskets. The first baffle 93 and the carrier board 91 are connected by welding. The first rotating axis is a rivet. The same applies to the second clamping position 96 which is symmetrically arranged with respect to the first clamping position 95. When the grip 97 is pulled to a right side, the grip 97 drives the second connecting rod 953, and the second connecting rod 953 drives the first connecting 953 to drive the first hook 951 so that the first hook 951 rotates in a clockwise direction about the first rotating axis to gradually enlarge the included angle between the first hook 951 and the first baffle 93, until the first hook 951 is in a released state (as illustrated in FIG. 4) to detach the motor driving assembly 90. The same applies to the second clamping portion 96 which is symmetrically arranged with respect to the first clamping portion 95. Therefore, the motor driving assembly 90 utilizes a plurality of connecting rods to achieve motion transmission and the self-locking of the hooks; when the grip 97 is pushed to a tangential position with respect to the first hook 951, the first hook 951 will be self-locked, so as to install the motor driving assembly 90 to the lifting assembly. As the motor driving assembly 90 allows the motor 92 to be assembled integrally with the quick disassembly clamping structure, the motor 92 can be quickly dismounted. The above configurations are simple in structure and easy to disassemble, and also enables the motor 92 to avoid water when necessary.

Overall, the embodiments of the present invention provide an electric lifting and moving machine, comprising: a bearing assembly which comprises a chassis, and the chassis is adopted to stabilize a bearing assembly and an electric lifting assembly; the bearing assembly comprises a seat board; when using the electric lifting and moving machine, a user sits on the seat board, and the motor driving assembly of the electric lifting assembly drives the lifting assembly; the lifting assembly ascends or descends and thus drives the bearing assembly to ascend or descend through the connecting rods. Therefore, the electric lifting and moving machine of the present invention achieves automatic ascending and descending with a simple structure and small volume, and improves the comfort of users.

Certainly, the above embodiments are only one of the more preferred specific examples of the present invention, and all modifications and substitutions made by those of ordinary skill in the art in accordance with the essence of the main technical solution of the present invention shall fall within the protection scope of the present invention.

What is claimed:

1. An electric lifting and moving machine, comprising:

a bearing assembly for bearing a user, which comprises a seat board;

a supporting assembly, which comprises a chassis;

an electric lifting assembly, comprising a motor driving assembly and a lifting assembly; the motor driving assembly is in transmission connection with the lifting assembly; the lifting assembly is arranged on the chassis;

at least one connecting rod, an end portion of which is connected to the lifting assembly, and another end portion is connected to the bearing assembly, so that the lifting assembly drives the bearing assembly to ascend or descend;

at least one castor, arranged on a bottom part of the chassis;

at least one foot brake assembly, arranged on the chassis corresponding to the castor; in a parked state of the electric lifting and moving machine, the foot brake assembly is in contact with the castor, so as to prevent the castor from rotating;

the lifting assembly comprises a movable portion and a fixed portion; the movable portion ascends or descends with respect to the fixed portion; the end portion of the connecting rod is connected to the movable portion;

the movable portion comprises:

a worm, the worm is in transmission connection with the motor driving assembly;

a worm wheel, the worm wheel is in transmission connection with the worm;

a rotating shaft, which penetrates a center part of the worm wheel and is fixedly connected to the worm wheel;

at least one gear; the rotating shaft penetrates a center part of the gear, and is fixedly connected to the gear;

the fixed portion comprises:

at least one gear rack, which is vertically arranged and meshes with the at least one gear; a bottom part of the gear rack is connected to the chassis;

said at least one connecting rod comprises two connecting rods;

said at least one gear rack is arranged on at least one gear rack column; said at least one gear rack column comprises two gear rack columns; the two gear rack columns are positioned corresponding to the two connecting rods; a bottom part of each of the two connecting rods is hollow to fit with the corresponding gear rack column;

said at least one gear comprises two gears, and arranged respectively on a left end portion and a right end portion of the rotating shaft;

an outer part of the movable portion is provided with a sleeve, openings are provided on the sleeve corresponding to positions where the gears are connected to the gear racks;

the two connecting rods are connected to the sleeve;

the bearing assembly comprises:

two supporting rods arranged vertically, and connected respectively to a left side and a right side of a front part of the seat board; the two supporting rods are connected respectively to the two connecting rods;

a seat back; an end portion of which is connected to a rear part of the seat board;

the seat board comprises a left seat board and a right seat board; the left seat board and the right seat board are connected through a first detachable connecting member;

the seat back comprises a left seat back and a right seat back; the left seat back and the right back are connected through a second detachable connecting member; an end portion of the left seat back is connected to a rear part of the left seat board; an end portion of the right seat board is connected to a rear part of the right seat board;

the two supporting rods are respectively hinged with the two connecting rods; the supporting rods are rotatable about the connecting rods respectively where the connecting rods are used as rotational axes of the supporting rods; alternatively, the left seat board and the right seat board are respectively hinged with the two supporting rods; the left seat board and the right seat board are rotatable respectively about the two supporting rods where the two supporting rods are used as rotational axes of the left seat board and the right seat board.

2. The electric lifting and moving machine of claim 1, wherein the foot brake assembly comprises:

a fixed shaft, connected to the chassis;

a lock pedal, an end portion of which is hinged with the fixed shaft; the lock pedal is rotatable about the fixed shaft being an axis of rotation of the lock pedal; another end portion of the lock pedal is a treadle; a bottom side of the treadle is provided with a buckle groove; in a parked state of the electric lifting and moving machine, the lock pedal rotates to abut against the castor;

a buckle assembly, an end portion of which is connected to the chassis, and another end portion is a buckle matching with the buckle groove; the buckle is in interference fit with the buckle groove; when in the parked state of the electric lifting and moving machine, a position of the buckle is arranged such that the buckle is locked with the buckle groove.

3. The electric lifting and moving machine of claim 1, wherein the electric lifting and moving machine further comprises gas springs; an end portion of each gas spring is connected to the chassis, and another end portion is connected to a corresponding one of the two connecting rods.

4. The electric lifting and moving machine of claim 1, wherein the motor driving assembly and the lifting assembly are detachably connected; the motor driving assembly comprises:

a carrier board, arranged vertically along a longitudinal direction;

a motor, connected to a right side of the carrier board;

a first baffle, arranged vertically along a horizontal direction, a right end of which is connected to a left side of the carrier board;

a second baffle, arranged symmetrically to the first baffle, a right end of which is connected to a left side of the carrier board;

a first clamping portion, which is rotatably connected to the first baffle;

a second clamping portion, arranged symmetrically to the first clamping portion, and rotatably connected to the second baffle;

a grip, arranged horizontally along a longitudinal direction; the grip is arranged above the first baffle and the second baffle; a front end portion of which is connected to the first clamping portion, a rear end portion of which is connected to a second clamping portion;

the first clamping portion comprises:

a first hook, a lower part of the first hook is in a hook shape bending to a right side; a middle part of the first hook is connected to the first baffle through a first rotating axis; the first hook is rotatable about the first rotating axis;

a first connecting member, a left end portion of which is rotatably connected to an upper portion of the first hook, and a right end portion of which is rotatably connected to one end of a second connecting member;

another end of the second connecting member is connected to a front end portion of the grip;

the second clamping portion comprises:

a second hook, a lower part of the second hook is in a hook shape bending to a right side; a middle part of the second hook is connected to the second baffle through a second rotating axis; the second hook is rotatable about the second rotating axis;

a third connecting member, a left end portion of which is rotatably connected to an upper portion of the second hook, and a right end portion of which is rotatably connected to one end of a fourth connecting member;

another end of the fourth connecting member is connected to the rear end portion of the grip.

* * * * *